Nov. 6, 1956  F. M. ECKERT ET AL  2,769,883
SPRING-LOADED ROTARY TYPE TRANSDUCER
Filed Oct. 14, 1954  3 Sheets-Sheet 1

INVENTORS
Francis M. Eckert
Richard J. MacDonnell
Paul H. Villars
BY W. R. Robertson
AGENT Nov. 6, 1956  F. M. ECKERT ET AL  2,769,883
SPRING-LOADED ROTARY TYPE TRANSDUCER
Filed Oct. 14, 1954  3 Sheets-Sheet 2

INVENTORS
Francis M. Eckert
Richard J. MacDonnell
Paul H. Villars
BY W. R. Robertson
AGENT Nov. 6, 1956 — F. M. ECKERT ET AL — 2,769,883
SPRING-LOADED ROTARY TYPE TRANSDUCER
Filed Oct. 14, 1954 — 3 Sheets-Sheet 3

INVENTOR.
Francis M. Eckert
Richard J. MacDonnell
Paul H. Villars
BY W. R. Robertson
AGENT United States Patent Office 2,769,883
Patented Nov. 6, 1956

2,769,883

SPRING-LOADED ROTARY TYPE TRANSDUCER

Francis M. Eckert, Arlington, Richard J. MacDonnell, Dallas, and Paul H. Villars, Grand Prairie, Tex., assignors to Chance Vought Aircraft, Incorporated, Dallas, Tex., a corporation of Delaware Application October 14, 1954, Serial No. 462,301

10 Claims. (Cl. 201—48)

This invention relates to electrical components with electrical properties or characteristics variable in nature, and is particularly concerned with transducers or position transmitters, but its principles may be applied to rheostats, variable inductances, variable transformers, and the like.

More specifically, this invention relates to a spring-loaded rotary type electrical position transmitter, or transducer, such as but not limited to a potentiometer. The transducer is one of the electrical type or of the magnetic type wherein the electrical signal emitted is modified with rotation of the transducer shaft away from an assigned zero reference position. This rotation of the shaft in modifying the signal emitted may vary the transducer resistance or vary the phase relationship of the magnetic field. The transducer of this invention comprises a spring that urges the shaft to return, rotatably, to a basic, stopped position at one end of its range of rotation. Accordingly a constant or fixed point of origin is always maintained. Further, means is provided for easy and quick changing of the assigned zero reference position.

A principal object of this invention is to provide a transducer installation which is considerably more accurate than rectilinear potentiometers, and one which may be readily changed from a single turn potentiometer to a multi-turn potentiometer.

Another object is to provide a transducer installation which would permit greater utility of rotary transducers.

A still further object of this invention is to provide a transducer installation with a uniform torque or spring tension throughout the full range of rotation.

Yet another object of this invention is to provide a transducer wherein a large number of transducers may be constructed so that each has the identical constant value of the first.

Another object of this invention is to provide a transducer installation adaptable for operation within a wide latitude of torque requirements, and further, one in which the frequency response is easily varied.

Other objects and advantages will be apparent from the specification and claims, and from the accompanying drawings which illustrate an embodiment of the invention.

Figure 1:
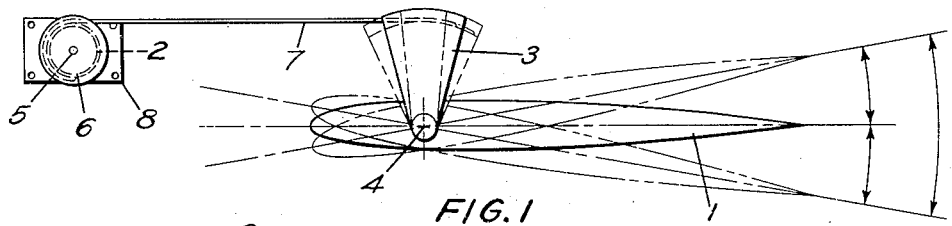
Fig. 1 is a schematic view of the transducer as applied to an aircraft control surface for registering the amount of deflection thereof.

Referring to the drawings, Fig. 1 schematically illustrates a typical installation of the invention wherein the movement of a control surface 1 of an aircraft, for example, actuates a transducer or a spring-loaded rotary-type electrical position transmitter as a potentiometer 2, for example, which in turn transmits a signal to a second instrument, as an oscillograph, or any other suitable indicating or recording device (not shown). While the connecting linkage system between the movable surface 1 and the potentiometer 2 may be a mechanical linkage, in this case, we prefer a flexible wire or cable type of connection. A sector 3 is fixedly secured to the movable surface 1 and accordingly oscillates with the surface about pivot point 4. On an arbor shaft 5 of the spring-loaded rotary type potentiometer 2 is mounted a pulley or reel 6. Arbor shaft 5 is an extension of the potentiometer shaft 20, and fixed thereto with pin 16. The latter shaft 20 is connected directly to the potentiometer wiper (not shown) and rotates therewith. A line, as a wire or cable 7, is connected to the outer edge of sector 3 farthest from pulley 6 and extends to and around the pulley before being secured thereto with a hook or the like. Accordingly, cable 7 always transmits linear motion in a direction normal to the sector radius which intersects the cable at its point of contact with the sector. Further, as illustrated in Fig. 1, the wire is so rigged that in no position within the range of travel of the pulley does the wire become collinear with a pulley radius. This pulley travel range is determined by potentiometer stops hereinafter described.

Figure 2:
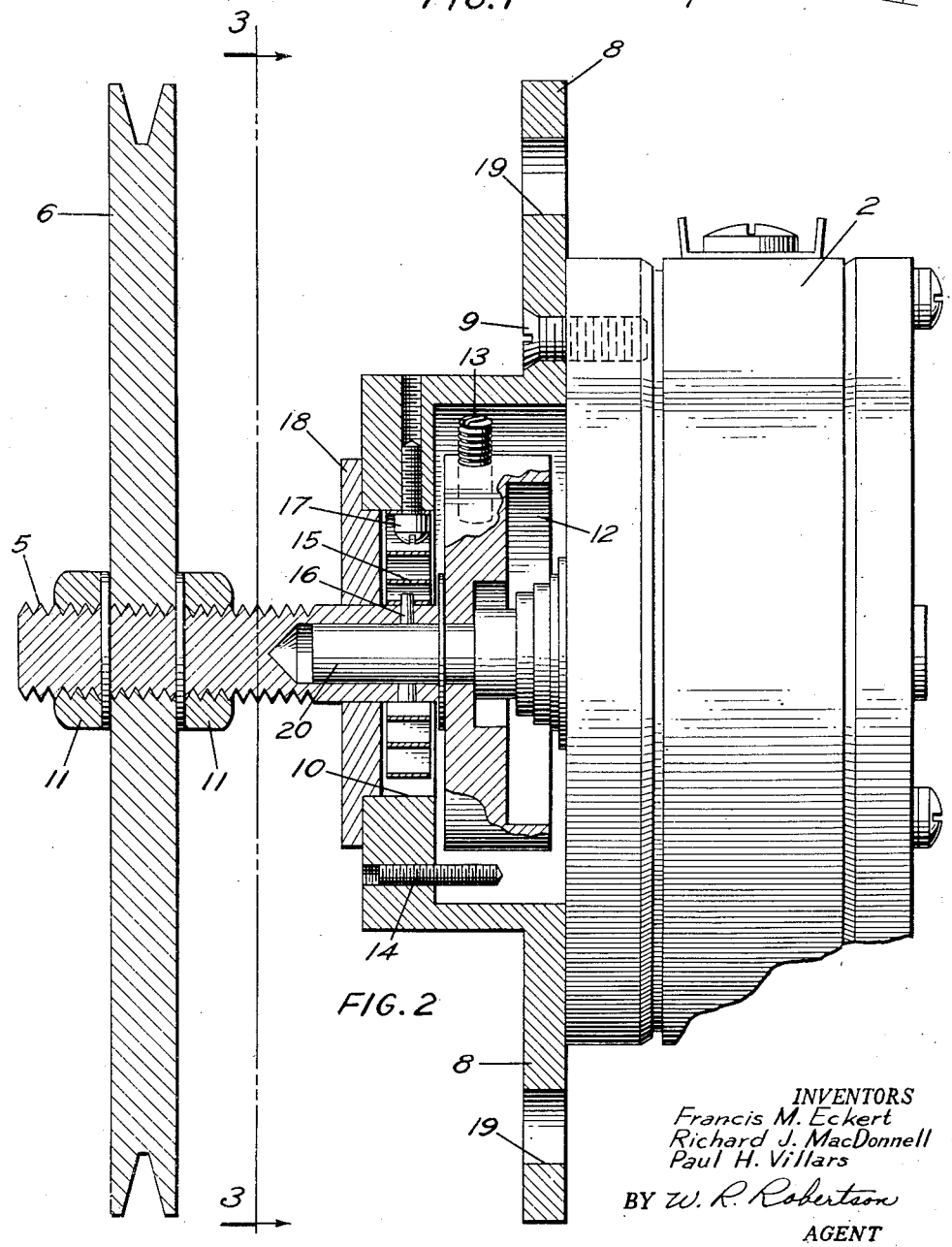
Fig. 2 is a partially sectional view taken along line 2—2 of Fig. 3, showing the spring-loaded rotary type transmitter as secured in the mounting plate housing.
Figure 3:
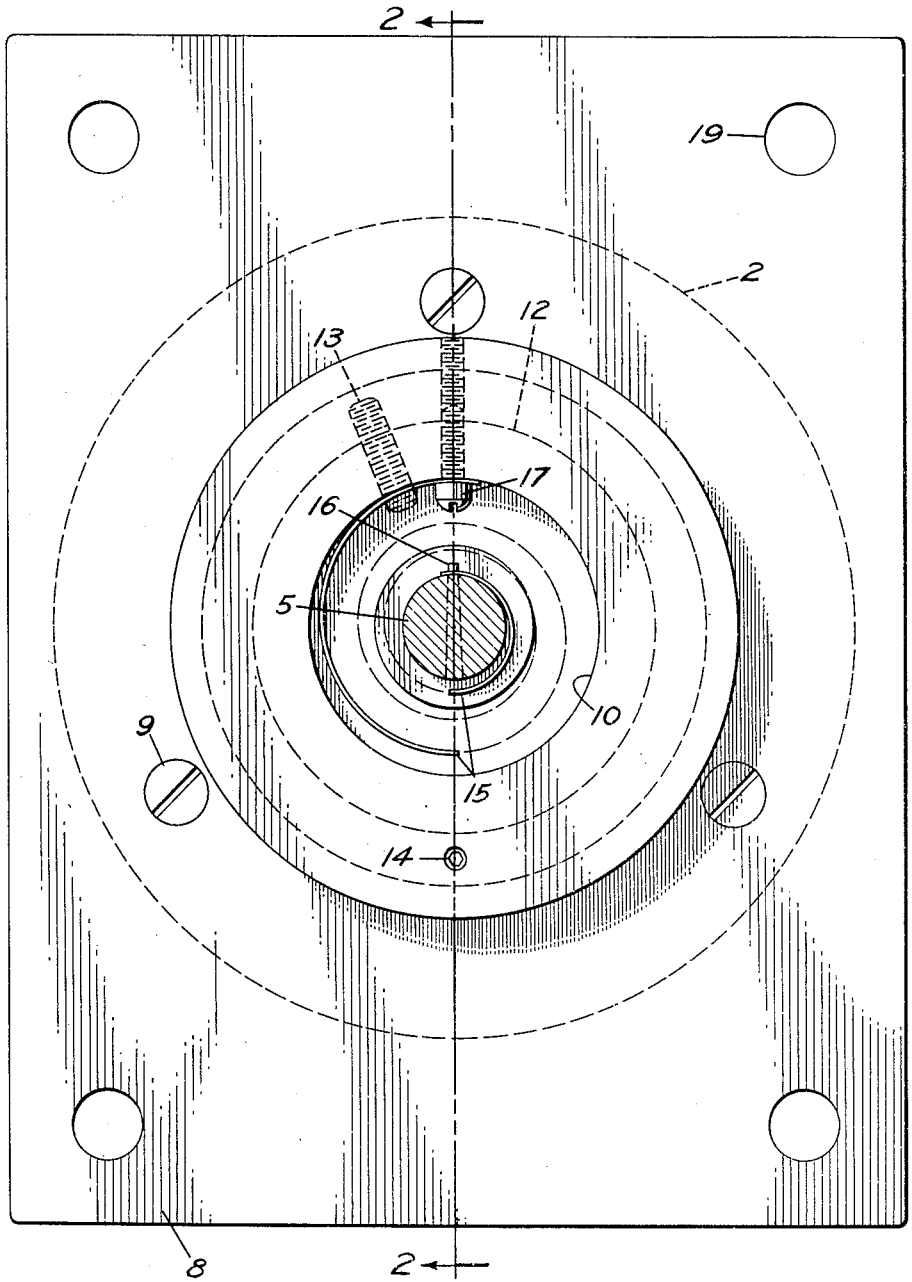
Fig. 3 is a sectional view taken along line 3—3 of Fig. 2, or a front view of the transmitter of Fig. 2 but with the cover plate and pulley removed for clarity of disclosure.
Figure 4:
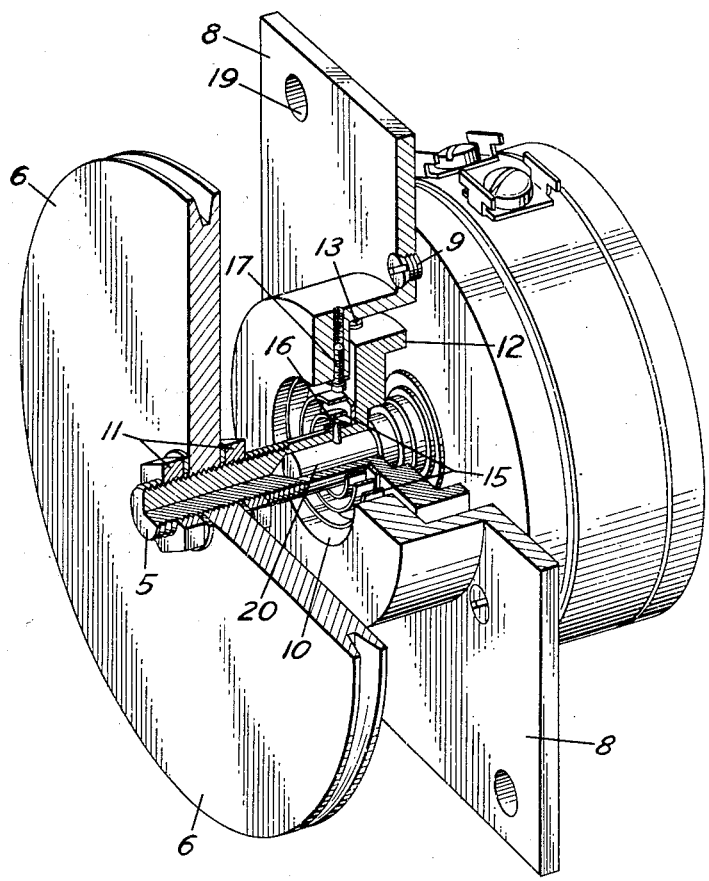
Fig. 4 is a perspective view of the potentiometer with a quarter cut away for purposes of clarity.

Internally of the potentiometer assembly is a flat spiral or coil spring 15, Figs. 2–4, wrapped around the potentiometer shaft 5, one end of spring 15 being secured to shaft 5 by pin 16. With the other end of the spring 15 connected to the housing mounting plate 8, by screw 17, the spring is prevented from unwinding by cable 7 which passes over and around the pulley 6 mounted on shaft 5. Accordingly, spring 15 serves to hold cable 7 taut at all times and to rotate the potentiometer shaft 5 counterclockwise when permitted by the aircraft control surface 1 and the cable 7 connected thereto. With the control surface in its horizontal or neutral position, the potentiometer 2 is, as is described hereinafter, phased or set in a neutral or zero reference position wherein an electrical signal of the desired characteristics is emitted from the potentiometer. The neutral position of the potentiometer is set so that the shaft may rotate approximately an equal distance in either direction.

In addition, when the control surface 1 is deflected downward from its neutral position, control surface rotary motion is translated by the sector 3 and wire 7 into rectilinear motion, transmitted through the wire to the pulley 6, and translated by the pulley into rotary motion of the transducer or potentiometer shaft 5, which in turn moves in a clockwise direction away from its neutral position and against the pull of the spring. When the control surface 1 returns to its neutral position, the potentiometer shaft 5 is returned to its neutral position by the force of the flat spiral spring 15, Figs. 2 and 3, included in the potentiometer assembly. Similarly, spring 15 rotates potentiometer shaft 5 counterclockwise from its neutral position as the constraint provided by the wire is relaxed by upward deflection of the control surface 1. The angles through which the potentiometer shaft 5 is rotated as a result of given control surface 1 motions are uniformly proportional to the amplitudes of the control surface motions, with the ratio of shaft 5 rotation to control surface deflection being dependent upon the radii of the sector 3 and pulley 6 chosen for the particular installation. The electrical signal emitted by the transducer or position transmitter which may be a potentiometer, or a synchro, such as but not limited to a Selsyn, Autosyn, or like type, varies in a manner corresponding to the positions occupied by the control surface 1.

As illustrated in Fig. 2, transducer 2 is attached to housing mounting plate 8 with screws 9 so as to overlie a recess in the housing plate. Accordingly the potentiometer is easily replaceable. Holes 19 in the outer flanges of the housing are provided for mounting it on the aircraft in the proper position adjacent the control surface 1 to which the installation is connected. Through a large opening 10 in the recess of the housing 8 protrudes the potentiometer shaft 5 with pulley 6 mounted thereon. Potentiometer pulley 6 is adjustably mounted on the threaded shaft 5 so that the pulley may be locked in any selected position by means of the two check nuts 11.

In regard to the stop means, a drum 12, or the like, is mounted on potentiometer shaft 5 and internally of the recess of housing 8. A set or stop screw 13 is threaded radially out of the drum in the outer periphery thereof. A stop 14 in the form of a screw is threaded into the recess of the housing and protrudes therein parallel with the shaft 5 and positioned radially just beyond drum 12. Stop 14 in the housing cooperates with stop screw 13 in the drum whereby rotational movement of drum 12 and hence the potentiometer shaft is limited to approximately 360 degrees as the drum set screw 13 contacts either side of stop 14; i. e., at each end of this range of rotation, stop screw 13 engages stop 14 and prevents further rotation of the potentiometer shaft. In Fig. 3, the potentiometer shaft 5 is shown rotated so that stop screw 13 lies at approximately the midway point in the range of rotation.

A principal feature of our invention is the utilization of the flat spiral spring 15 as disclosed in Figs. 2–4. This spring 15 is mounted in the large opening 10, its inner end secured to the potentiometer shaft 5 with the same pin 16 which fastens the potentiometer shaft extension 5 to shaft 20, and its outer end fastened to the edge, or peripheral wall surface, of the large opening in housing 8 with radially extending screw 17. The diameter of hole 10 is determined by the number of turns in the spring intended to be used. This spring 15 resists rotation of the arbor shaft from its basic stopped position, and, when the shaft is rotated and released, returns the shaft to the basic position. If desired, the basic position of the transducer may readily be reversed by removing, inverting, and reinstalling the spiral spring. While in our preferred production model we utilize 10–30 turns in the flat spiral spring, the drawings only show 3 turns for clarity of disclosure. An important feature of our potentiometer installation is the fulfillment of the requirement of a uniform torque or spring tension throughout the particular range of operation desired. Other instruments with a spiral spring are useless when used for accurate measuring and transmitting of electrical signals due to the variable torque throughout the range of normal operation. Further, the frequency response of the spring may be varied by varying the dimensions, length, width or thickness of the spring material.

The disclosed potentiometer or transducer is particularly designed and adaptable for reproduction in large numbers wherein any group of potentiometers may have the same constant value or torque. Since the force gradient or torque of the spring varies with the number of revolutions set in the spring, the torque may be set to a precise particular value in each potentiometer. The number of turns of the flat spiral spring and the preloading of torque thereof is readily set with removable attaching screw 17 at the outer end of the spring for varying the number of full turns and with removable attaching pin 16 at the inner end of the spring for adjustment to the proper half turn. Further, our potentiometer or transducer is very adaptable for miniaturized equipment.

The large opening 10 is sealed and the spring protected by a circular cap or flanged cover plate 18, Fig. 2, closely fitting in opening 10 in the recess of the housing and around shaft 5. Cap 18 is secured to the recess of the housing 8 with screws (not shown) through the flange of the cap. The spring constant and torque requirement in each potentiometer may be set, by varying the diameter of the spring, which in turn is controlled to a great extent by the diameter of the large opening in which the spring is housed. Since the disclosed spring is very adaptable for coiling in various sized spring housing openings, it is accordingly operable within a wide latitude of potentiometers of various torque requirements.

This potentiometer is a convertible spring-loaded rotary type electrical position transmitter as it may be utilized either as a single turn potentiometer or as a multi-turn potentiometer. With stop 14 projecting internally of housing mounting plate 8, potentiometer shaft 5 and its stop 13 on drum 12 are limited to approximately 360 degrees of rotation. However, by removal of stop 14 from the housing mounting plate, a wider range may be obtained from the potentiometer when required by the particular installation, by converting it to a spring loaded multi-turn potentiometer. In place of stops in this embodiment, the degree of clockwise rotation, Fig. 3, of the potentiometer shaft is limited by the size of the large opening 10 (for mounting the spring in housing 8) and the length of the spring. The stopped position is reached when the spring lies in contact with the walls of the large opening 10 and the spring is expanded until its circular elements are contiguous or in contact with each other. Likewise, with the stops removed the degree of anti-clockwise rotation of the potentiometer shaft, as viewed in Fig. 3, is limited by the length of the spring as it is drawn up tight around shaft 5.

Figure 5:
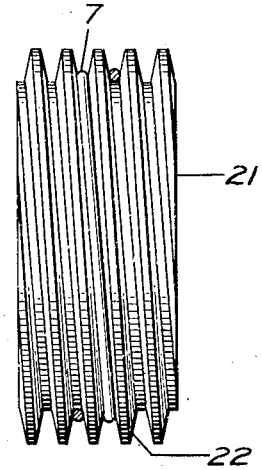
Fig. 5 illustrates schematically a modified pulley to be substituted for the single pulley in converting the single turn spring-loaded potentiometer of Figs. 2–4 into a multi-turn spring-loaded potentiometer.

In the arrangement requiring more than one turn of the potentiometer shaft and the pulley thereon, we substitute a worm type of wheel or pulley 21, Fig. 5, for the single pulley 6. As disclosed in Fig. 5, this pulley is characterized by a helical groove 22 around the peripheral surface thereof. Pulley 21 accordingly provides a smooth transition of the rectilinear motion of cable 7 to the rotary motion of the potentiometer and maintains the ratio of shaft 5 rotation to control surface deflection constant. These features would be impossible to maintain in a single groove multiturn potentiometer because the cable would wrap around itself, wedge tight or tangle, and the effective pulley radius would vary, resulting in a non-constant rotary motion and irregular and inaccurate signals transmitted by the potentiometer. Accordingly, the shaft with the worm pulley may rotate several turns as required for the multi-turn potentiometer installation.

In operation to determine the motion of the surface to be indicated, as an aircraft control surface in our example, downward motion of the control surface results in clockwise rotation of the pulley and of the potentiometer shaft 5. With every movement of the control surface 1 the potentiometer 2 accordingly transmits a signal to an oscillograph, or to any other suitable indicating or recording device. When the surface 1 returns to neutral, the spring 15 in the potentiometer 2 rotates the shaft 5 and pulley 6 back to their assigned neutral position. Upward deflection of the surface slackens or moves the sector 3 toward the pulley whereupon the potentiometer spring is permitted to rotate the potentiometer shaft counterclockwise from its neutral position and maintains the wire taut. Amplitude of potentiometer shaft rotation is proportional to control surface motion, with the ratio being dependent upon the radii of the sector and pulley chosen for the installation. Accordingly, the electrical signal of the potentiometer varies with the control surface position.

While only two embodiments of the invention have been illustrated in the accompanying drawings, it will be evident that various other modifications and position transmitters are possible in the arrangement and construction of the various components of the mechanism without departing from the scope of the invention.

We claim:

1. A convertible spring-loaded rotary type electrical position transmitter for receiving rotary motion from a movable element and transmitting it in the form of an electrical signal to an oscillograph comprising, a potentiometer adapted to contain a wiper arm, a rotatable shaft means secured in said potentiometer for connection to the wiper arm and rotatable therewith, said potentiometer supported by a housing means, said housing means having a large opening therein, said shaft protruding through said large opening, removable cooperating stop means internally of said housing means and mounted on both of said housing means and said shaft means for limiting the amount of rotation of said shaft relative to said potentiometer to substantially one turn whereby said stop means is easily removable for converting the single-turn transmitter to a multi-turn transmitter, and a flat spiral spring in said opening around said shaft, one end of said spring secured to said shaft and the other end of said spring secured to the edge of said large opening in the housing whereby the potentiometer shaft is always biased towards a constant and fixed point of origin, said flat spiral spring maintaining a uniform and constant torque throughout the range of operation of said potentiometer.

2. A spring-loaded rotary type electrical position transmitter for receiving rotary motion from a movable element and transmitting it in the form of an electrical signal to an oscillograph comprising, a potentiometer adapted to contain a wiper arm, a rotatable shaft means secured in said potentiometer for connection to the wiper arm and rotatable therewith, said potentiometer supported by a housing means, said housing means having a large opening therein, said shaft protruding through said large opening, removable, cooperating stop means on said housing means and on said shaft means for limiting the amount of rotation of said shaft relative to said potentiometer whereby the potentiometer shaft may rotate a limited amount in either direction as determined by the stop means, the potentiometer shaft adapted to assume a basic stopped position when it has rotated in one direction until limited by the stop means, and a flat spiral spring in said opening around said shaft, the inner end of said spring secured to said shaft and the outer end of said spring secured to the edge of said large opening, whereby the potentiometer shaft is always biased and will return as permitted by the movable element towards a constant and fixed point of origin which is its basic stopped position, said flat spiral spring maintaining a uniform and constant torque throughout the range of operation of said potentiometer.

3. A convertible rotary type transmitter for receiving rotary motion from a movable element and transmitting it in the form of an electrical signal comprising, a transducer with a rotatable shaft for varying the signal output of the transducer, said transducer supported by a housing means with a large opening therein, said shaft protruding through said large opening, removable cooperating stop means provided on said housing and on said shaft for limiting the amount of rotation of said shaft relative to said transducer to substantially one turn whereby said stop means is easily removable for converting the single-turn transmitter to a multi-turn transmitter, and a flat spiral spring in said housing means opening for providing uniform and constant torque throughout the range of operation of the transducer, the inner end of said flat concentric spring detachably secured to said shaft and the outer end of said flat spiral spring detachably secured to the peripheral surface of said housing means opening whereby the number of turns of said flat spiral spring around the shaft is adjustable to provide a precise particular value of force gradient in the spring.

4. A rotary type motion transmitter for receiving rotary motion from a movable element and transmitting it in the form of an electrical signal comprising, a transducer with a rotatable shaft for varying the signal output of the transducer, a housing means with a large opening therein for supporting said transducer with said shaft protruding through said large opening, removable cooperating stop means provided on said housing means and on said shaft for limiting the degree of rotation of said shaft relative to said transducer to one turn so that a greater amount of rotation is provided with said stop means removed, said stop means on said housing means protruding inwardly of said housing means parallel to said transducer shaft, said stop means on said shaft comprising a drum means fixed to said shaft internally to said housing means, stop screw means on said drum means for contact with said housing stop means when said shaft is rotated, and adjustable flat spiral spring means between said shaft and said housing means for providing uniform and constant torque throughout the range of operation of said transducer and for providing any precise particular force gradient value within the range of operation of said transducer.

5. A transmitter installation comprising, a housing, a transmitter mounted in said housing and having a rotatable shaft projecting through said housing, removable cooperating stop means mounted on said housing and on said shaft for limiting the degree of rotation of said shaft relative to said transmitter, and adjustable flat spiral spring means between said shaft and said housing for providing uniform and constant torque throughout the range of operation of said transmitter and for providing any precise particular force gradient value within the range of operation of said transmitter.

6. A spring-loaded rotary type electrical position transmitter for receiving rectilinear motion from a movable element and transmitting it in the form of an electrical signal, comprising a transducer with a rotatable shaft for varying the signal output of the transducer, a housing with a large opening therein, said transducer mounted in said housing with said shaft protruding through said large opening, a single groove pulley means mounted on said shaft for receiving said rectilinear motion and converting it to rotary motion, cooperating stop means provided on said housing and on said shaft for limiting the amount of rotation of said shaft relative to said transducer, and adjustable flat spiral spring means between said shaft and said housing means for providing uniform and constant torque throughout the range of operation of said transducer and for providing any precise particular force gradient value within the range of operation of said transducer.

7. A multi-turn spring-load rotary type electrical position transmitter for receiving rectilinear motion from a movable element and transmitting it in the form of an electrical signal, comprising a transducer with a rotatable shaft for varying the signal output of the transducer, a housing with a large opening therein, said transducer mounted in said housing with said shaft protruding through said large opening, a helical grooved pulley means mounted on said shaft for receiving said rectilinear motion and converting it to rotary motion, adjustable flat spiral spring means between said shaft and said housing means for providing uniform and constant torque throughout the range of operation of said transducer and for providing any precise particular force gradient value within the range of operation of said transducer, cooperating stop means in said housing for limiting the rotation of said shaft controlled by the length of said spring and the size of said large opening.

8. A transducer installation comprising, a mounting plate, said plate having a recess with a large opening therein, a transducer mounted on said plate over said recess, a transducer rotatable shaft protruding through said opening, a drum mounted on said shaft in said recess, cooperating stop means mounted inside of said recess on said drum and on said plate for limiting the amount of rotation of said shaft, and other means in said large opening responsive to the rotation of said shaft for providing uniform and constant torque throughout the range of operation of said transducer.

9. In a transducer installation as recited in claim 8, said other means comprising a flat spiral spring mounted in said opening in said mounting plate recess, one end of said spring detachably secured to said shaft and the other end of said spring detachably secured to the periphery of said opening for readily varying the force gradient of the spring.

10. An electrical position transmitter installation comprising, a sector having an arcuate surface at one end thereof, the other end of said sector adapted to be fixedly secured to a reciprocable element and adapted to reciprocate therewith, a rotatable shaft, a pulley mounted on said shaft, a line, an end of said line connected to said sector arcuate surface, said line lying over a portion of said arcuate surface before extending tangentially therefrom to said pulley, said line circumscribing at least a portion of said pulley and connected thereto for transmitting reciprocal motion from the reciprocable element to rotary motion in said shaft, said shaft being spring-biased in a direction so as to maintain the line taut, and a transmitter connected to said shaft and responsive to the degree of shaft rotation for transmitting electrical signals to an oscillograph proportional to the movement of the reciprocable element.

References Cited in the file of this patent
UNITED STATES PATENTS

| | | |
|---|---|---|
| 441,217 | Wheless | Nov. 25, 1890 |
| 897,713 | Burns | Sept. 1, 1908 |